United States Patent
Kim et al.

(10) Patent No.: US 12,229,891 B2
(45) Date of Patent: Feb. 18, 2025

(54) IMAGE PROCESSING DEVICE GENERATING 3D CULTURAL ASSET DATA AND OPERATION METHOD THEREOF

(71) Applicant: Electronics and Telecommunications Research Institute, Daejeon (KR)

(72) Inventors: Hyun Joo Kim, Daejeon (KR); JoongYong Choi, Daejeon (KR); Hyung-Keun Jee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 97 days.

(21) Appl. No.: 17/968,118

(22) Filed: Oct. 18, 2022

(65) Prior Publication Data
US 2023/0290059 A1  Sep. 14, 2023

(30) Foreign Application Priority Data

Mar. 8, 2022 (KR) .................. 10-2022-0029347

(51) Int. Cl.
*G06T 17/20* (2006.01)
*G06T 7/80* (2017.01)
*G06T 15/04* (2011.01)

(52) U.S. Cl.
CPC ............ *G06T 17/20* (2013.01); *G06T 7/80* (2017.01); *G06T 15/04* (2013.01); *G06T 2200/24* (2013.01)

(58) Field of Classification Search
CPC ........... G06T 17/20; G06T 15/04; G06T 7/80; G06T 2200/24
See application file for complete search history.

(56) References Cited

U.S. PATENT DOCUMENTS

| | | | |
|---|---|---|---|
| 9,224,241 B2 | 12/2015 | Son | |
| 10,204,184 B2 | 2/2019 | Lee et al. | |
| 10,963,809 B2 | 3/2021 | Gambetta et al. | |
| 2006/0104539 A1 | 5/2006 | Kim et al. | |
| 2018/0352254 A1* | 12/2018 | Alpaslan | H04N 13/232 |

(Continued)

FOREIGN PATENT DOCUMENTS

| | | |
|---|---|---|
| EP | 4 195 160 A1 | 6/2023 |
| JP | 2020-80173 A | 5/2020 |

(Continued)

OTHER PUBLICATIONS

Korean Office Action issued on Oct. 31, 2024, in counterpart Korean Patent Application No. 10-2022-0029347 (11 pages in English, 11 pages in Korean).

*Primary Examiner* — Michelle Chin
(74) *Attorney, Agent, or Firm* — NSIP Law

(57) ABSTRACT

Disclosed is an image processing device, which includes a plurality of sensors that output two or more different types of sensing data, a processor that synchronizes the sensing data, extracts image processing-related information from the synchronized sensing data, and generates a gigapixel texture and a three-dimensional (3D) mesh based on the image processing-related information, a user interface that visualizes and outputs 3D cultural asset data generated based on the gigapixel texture and the 3D mesh, and a memory that stores the image processing-related information and the 3D cultural asset data. The image processing-related information includes a multi-viewpoint image, a calibration image, and a camera parameter.

20 Claims, 11 Drawing Sheets

(56) References Cited

U.S. PATENT DOCUMENTS

2020/0312029 A1* 10/2020 Heinen .................. G06T 17/20
2021/0109987 A1* 4/2021 Avila ................... G06T 15/205

FOREIGN PATENT DOCUMENTS

| KR | 10-2014-0144089 A | 12/2014 |
| KR | 10-2016-0092190 A | 8/2016 |
| KR | 10-1859774 B1 | 5/2018 |
| KR | 10-1863188 B1 | 6/2018 |
| KR | 10-2018-0087918 A | 8/2018 |
| KR | 10-2019-0040746 A | 4/2019 |
| KR | 10-2020-0121997 A | 10/2020 |
| KR | 10-2258610 B1 | 5/2021 |
| KR | 10-2021-0075379 A | 6/2021 |

* cited by examiner

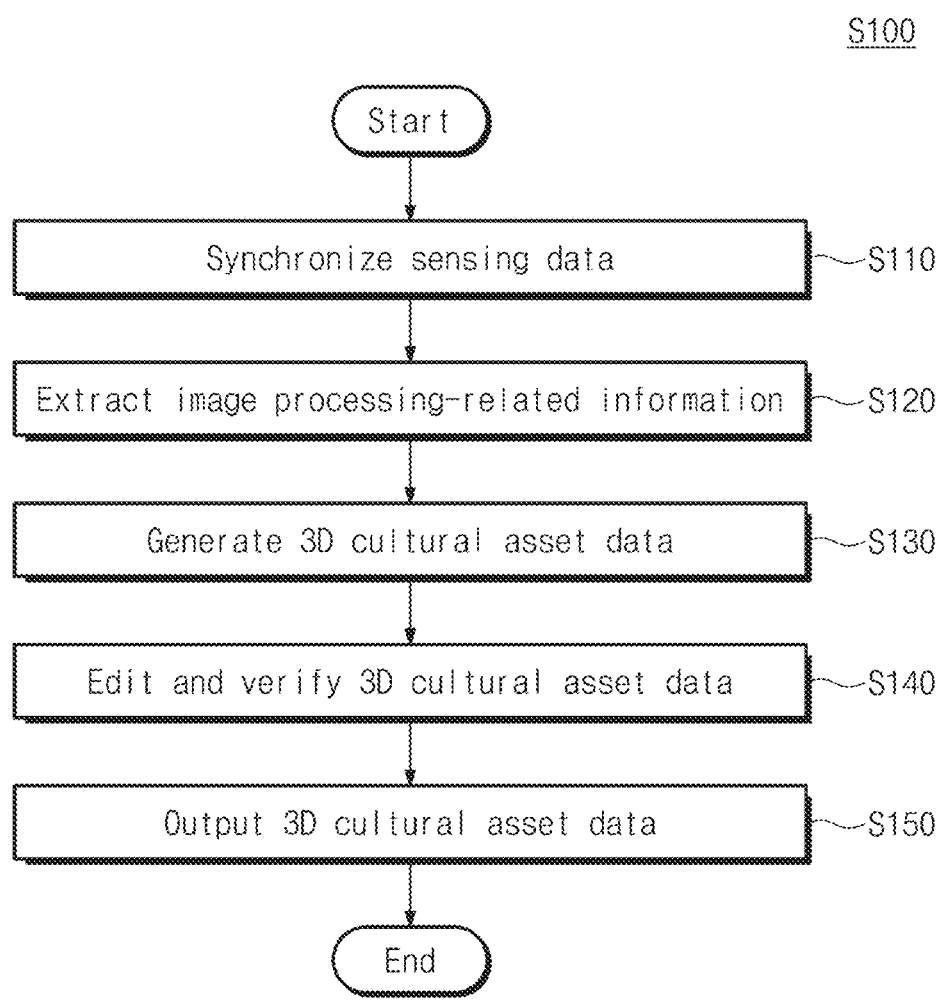

IMAGE PROCESSING DEVICE GENERATING 3D CULTURAL ASSET DATA AND OPERATION METHOD THEREOF

CROSS-REFERENCE TO RELATED APPLICATIONS

This application claims priority under 35 U.S.C. § 119 to Korean Patent Application No. 10-2022-0029347, filed on Mar. 8, 2022, in the Korean Intellectual Property Office, the disclosures of which are incorporated by reference herein in their entireties.

BACKGROUND

Embodiments of the present disclosure described herein relate to an image processing device, and more particularly, relate to an image processing device capable of generating high-resolution 3D cultural asset data for construction and spread of digital cultural assets, and an operation method thereof.

The digital cultural asset may include two-dimensional (2D) cultural asset data and three-dimensional (3D) cultural asset data. The 3D cultural asset data may be generated using a 3D scanner or using photogrammetry technology.

The technology using the 3D scanner only targets three-dimensional cultural assets, and the scanners applied to cultural assets differ depending on their precision. High-precision 3D scanners are mainly optimized for 3D reconstruction of small objects and support relatively low-resolution color textures. While a camera acquires only the 2D information (x, y) and color information of the object surface, the 3D scanner acquires not only the surface information (x, y) of the object but also the depth information (depth, z) of the object. Through this, a point map (viewpoint map) obtained by sampling geometric information (x, y, z) from the surface of the object is formed, but since even minute variations of the surface of the object are acquired, the data capacity is large and the structure is complicated. In addition, the 3D scanners are mainly expensive equipment, and the scan results have a big difference depending on the user's technical proficiency, and the user's professional pre-processing and post-processing are required.

Commercial tools using existing photogrammetry technology are mainly optimized for 3D restoration over a large area, but they do not support high-precision 3D restoration and gigapixel-level texture restoration.

On the other hand, in general, when cultural relics are excavated, experts (archaeologists, conservation scientists, etc.) discuss the situation of the site, the number and types of relics, materials of relics, and the purpose of excavation, should photograph the excavation site and relics, and should pack and store them for preservation. In this case, accurate and prompt photography is required to record the excavation site and the state of the relics at the time of excavation.

Conventional technology for generating high-resolution 3D data in such site requires a fixed position, uniform lighting, precise machine operation, and a lot of time, and it is difficult to determine a shaded area in real time during photographing. Therefore, there is a need for a technology for generating 3D cultural asset data that converges multiple heterogeneous sensor information based on free viewpoints without spatial constraints.

SUMMARY

Embodiments of the present disclosure provide an image processing device capable of generating high-resolution 3D cultural asset data by generating a precise 3D mesh and by matching a gigapixel texture using data acquired from multiple heterogeneous sensors, and an operation method thereof.

According to an embodiment of the present disclosure, an image processing device includes a plurality of sensors that output two or more different types of sensing data, a processor that synchronizes the sensing data, extracts image processing-related information from the synchronized sensing data, and generates a gigapixel texture and a three-dimensional (3D) mesh based on the image processing-related information, a user interface that visualizes and outputs 3D cultural asset data generated based on the gigapixel texture and the 3D mesh, and a memory that stores the image processing-related information and the 3D cultural asset data. The image processing-related information includes a multi-viewpoint image, a calibration image, and a camera parameter.

According to an embodiment, the plurality of sensors may include a first sensor including a digital camera, a second sensor including a tracking sensor, and a third sensor including at least one of a depth sensor and a lidar.

According to an embodiment, the processor may include a data synchronization circuit that controls the plurality of sensors to receive the synchronized sensing data, an information extraction circuit that extracts the image processing-related information based on the sensing data, a 3D data generation circuit that generates the gigapixel texture and the 3D mesh through luminance restoration and geometric alignment based on the image processing-related information and generates the 3D cultural asset data by matching the gigapixel texture to the 3D mesh, and an editing/verification circuit that generates final 3D cultural asset data by removing noise from the 3D cultural asset data and verifying whether the noise-removed 3D cultural asset data passes a predetermined criterion.

According to an embodiment, the data synchronization circuit may include a sensor controller that generates a control signal that sequentially operates the plurality of sensors at specific time intervals, and an input/output circuit that receives the synchronized sensing data from each of the plurality of sensors and provides the received sensing data to the information extraction circuit.

According to an embodiment, the information extraction circuit may extract distance information and viewpoint information from the sensing data, may generate the multi-viewpoint image and the calibration image based on the distance information and the viewpoint information, and may extract the camera parameter including an initial camera parameter from the sensing data.

According to an embodiment, the information extraction circuit may extract tracking information from the sensing data, may generate a point map based on the tracking information, and may provide the point map and the viewpoint information to the user interface in real time.

According to an embodiment, the 3D data generation circuit may include a pre-processing circuit that extracts a radial distortion parameter, a color conversion mapping matrix, and a camera internal parameter based on the multi-viewpoint image and the calibration image, a luminance restoration circuit that generates a luminance map by performing the luminance restoration on the multi-viewpoint image based on the multi-viewpoint image, the radial distortion parameter, and the color conversion mapping matrix, a geometric alignment circuit that performs a geometric alignment on the multi-viewpoint image based on the multi-viewpoint image, the initial camera parameter, and the camera internal parameter to generate a final camera parameter, and a post-processing circuit that generates the gigapixel texture and the 3D mesh based on the luminance map and the final camera parameter.

According to an embodiment, the post-processing circuit may generate the gigapixel texture using a texture blending technique based on the luminance map and the final camera parameter, and may generate the 3D mesh using a 3D geometric restoration technique.

According to an embodiment, the 3D data generation circuit may further include a matching circuit that generates the 3D cultural asset data by matching the gigapixel texture to the 3D mesh.

According to an embodiment, the user interface may receive the final 3D cultural asset data from the editing/verification circuit and may output the final 3D cultural asset data to a user through a gigapixel data viewer.

According to an embodiment, the processor may further include a management/sharing circuit that shares the 3D cultural asset data with a plurality of users.

According to an embodiment, the management/sharing circuit may visualize the 3D cultural asset data based on an LoD (Level of Detail) technology to be shared with the plurality of users, and may share the 3D cultural asset data with other commercial programs based on an asset linkage technology.

According to an embodiment of the present disclosure, a method of operating an image processing device includes controlling a plurality of heterogeneous sensors to receive synchronized sensing data, extracting image processing-related information from the sensing data, generating 3D data including a gigapixel texture and a three-dimensional (3D) mesh based on the image processing-related information, generating 3D cultural asset data by matching the gigapixel texture to the 3D mesh, and visualizing the 3D cultural asset data and outputting the visualized 3D cultural asset data through a user interface. The image processing-related information includes a multi-viewpoint image, a calibration image, and a camera parameter.

According to an embodiment, the extracting of the image processing-related information may include extracting distance information and viewpoint information from the sensing data, and generating the multi-viewpoint image and the calibration image based on the distance information and the viewpoint information, and extracting the camera parameter including an initial camera parameter from the sensing data.

According to an embodiment, the extracting of the image processing-related information may further include extracting tracking information from the sensing data, generating a point map based on the tracking information, and providing the point map and the viewpoint information to the user interface in real time.

According to an embodiment, the generating of the 3D data may include extracting a radial distortion parameter, a color conversion mapping matrix, and a camera internal parameter based on the multi-viewpoint image and the calibration image, generating a luminance map by performing the luminance restoration on the multi-viewpoint image based on the multi-viewpoint image, the radial distortion parameter, and the color conversion mapping matrix, performing a geometric alignment on the multi-viewpoint image based on the multi-viewpoint image, the initial camera parameter, and the camera internal parameter to generate a final camera parameter, and generating the gigapixel texture and the 3D mesh based on the luminance map and the final camera parameter.

According to an embodiment, the gigapixel texture may be generated by using a texture blending technique based on the luminance map and the final camera parameter, and the 3D mesh may be generated by using a 3D geometric restoration technique based on the luminance map and the final camera parameter.

According to an embodiment, editing/verifying of the 3D cultural asset data may include removing noise with respect to the 3D cultural asset data, verifying whether the noise-removed 3D cultural asset data passes a predetermined criterion, and generating final 3D cultural asset data that are passed in the verifying and storing the final 3D cultural asset data.

According to an embodiment, the outputting of the visualized 3D cultural asset data through the user interface may include outputting the final 3D cultural asset data to a user through a gigapixel data viewer.

According to an embodiment, the method of operating an image processing device may further include visualizing the 3D cultural asset data based on an LoD (Level of Detail) technology to be shared with the plurality of users, and sharing the 3D cultural asset data with other commercial programs based on an asset linkage technology.

BRIEF DESCRIPTION OF THE FIGURES

The above and other objects and features of the present disclosure will become apparent by describing in detail embodiments thereof with reference to the accompanying drawings.

FIG. 7 is a flowchart illustrating an operation method of an image processing device of FIG. 1.

DETAILED DESCRIPTION

Hereinafter, embodiments of the present disclosure will be described clearly and in detail such that those skilled in the art may easily carry out the present disclosure. However, since the present disclosure may be embodied in various different forms within the scope of the claims, the embodiments described below are merely examples regardless of whether they are expressed or not. That is, the present disclosure is not limited to the embodiments disclosed below and may be implemented in various different forms.

Figure 1:
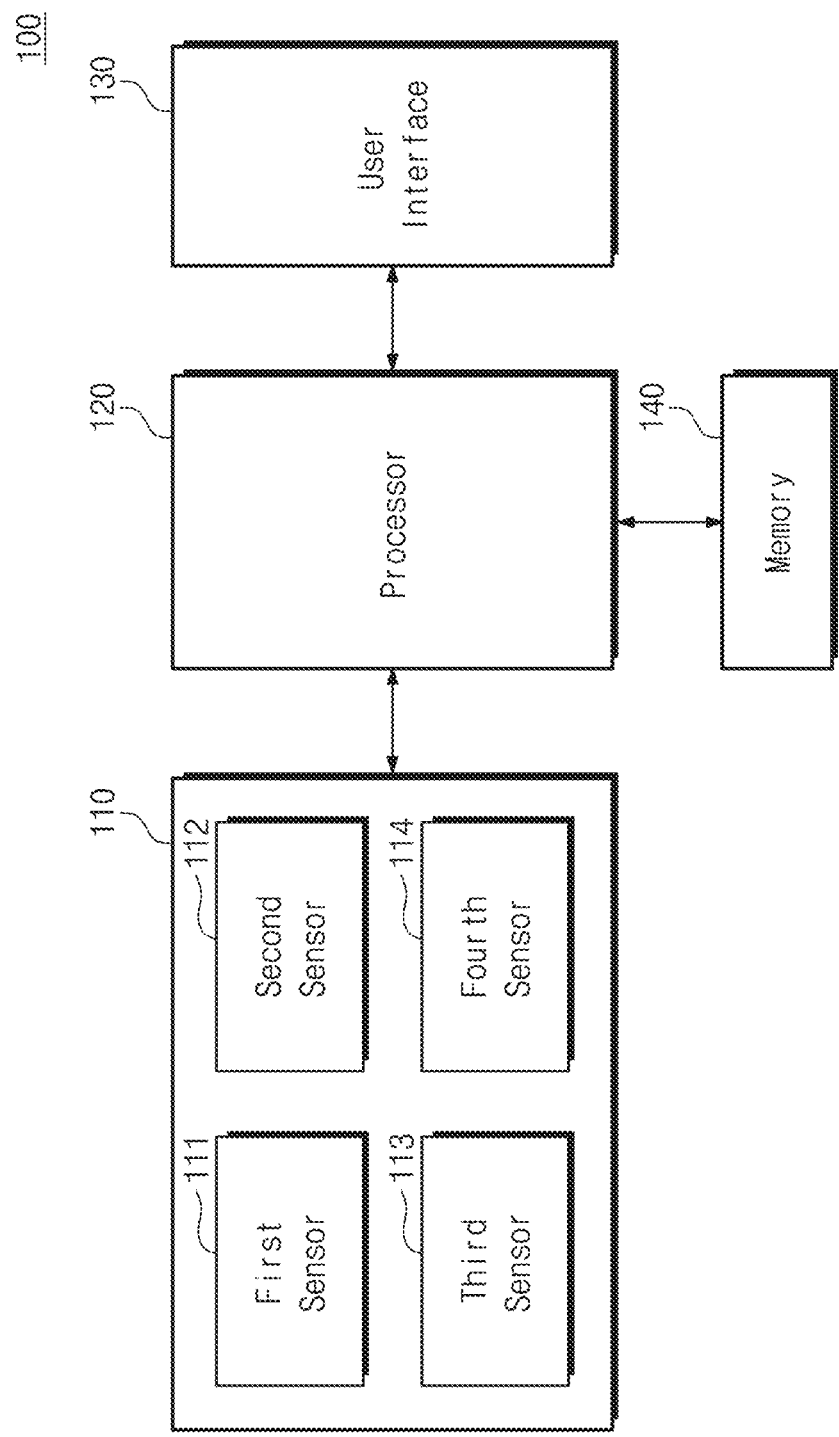
FIG. 1 is a block diagram of an image processing device according to an embodiment of the present disclosure.

FIG. 1 is a block diagram of an image processing device according to an embodiment of the present disclosure.

Referring to FIG. 1, the image processing device 100 may include a sensor 110, a processor 120, a user interface 130, and a memory 140.

The image processing device 100 may generate 3D cultural asset data. The image processing device 100 may acquire various information (e.g., image processing-related information) photographed from a free viewpoint from the sensor 110 including heterogeneous sensors. In this case, the image processing device 100 may improve the quality of the 3D cultural asset data by detecting a shaded area in real time. In addition, the 3D cultural asset data may be restored to a 3D mesh using a 3D geometric correction technique, and may be matched with a high-resolution texture through a texture blending technique.

The image processing device 100 may include at least one printed circuit board (PCB). The sensor 110, the processor 120, the user interface 130, and the memory 140 may be electrically connected to the printed circuit board.

The sensor 110 may include two or more heterogeneous sensors. For example, the sensor 110 may include first to fourth sensors 111, 112, 113, and 114. The first sensor 111 may include a camera. For example, the first sensor 111 may include a digital camera. The second sensor 112 may include a tracking sensor. For example, the second sensor 112 may include an infrared-based tracking sensor. The third sensor 113 may include a depth sensor. For example, the third sensor 113 may include a time of flight (ToF) type depth sensor. The fourth sensor 114 may include a lidar. For example, the fourth sensor 114 may include a fixed lidar.

In the following descriptions, for convenience of description, the first to fourth sensors 111, 112, 113, 114 are exemplified as a digital camera, a tracking sensor, a depth sensor, and a lidar, respectively, but the types and number of sensors are not limited thereto. For example, the sensor 110 may further include an Inertial Measurement Unit (IMU), a Global Positioning System (GPS), etc.

The first to fourth sensors 111, 112, 113, and 114 may provide sensing data to the processor 120. The sensing data may be acquired at a free viewpoint. In detail, the first to fourth sensors 111, 112, 113, and 114 may obtain the sensing data by operating at different angles or positions, respectively, and may provide the corresponding sensing data to the processor 120.

The processor 120 may receive the sensing data from the first to fourth sensors 111, 112, 113, and 114, and may process the sensing data to generate 3D cultural asset data. The processor 120 may extract various information from the sensing data, and may generate a gigapixel texture and a 3D mesh based thereon. The processor 120 may generate the 3D cultural asset data by matching the gigapixel texture with the 3D mesh. A detailed description of the processor 120 will be described later with reference to FIG. 2.

The processor 120 may be electrically connected to the sensor 110, the user interface 130, and the memory 140 to exchange signals. The processor 120 may be implemented using at least one of ASICs (application specific integrated circuits), DSPs (digital signal processors), DSPDs (digital signal processing devices), PLDs (programmable logic devices), FPGAs (field programmable gate arrays), processors, controllers, micro-controllers, microprocessors, and other electrical units for performing functions.

The user interface 130 may be electrically connected to the processor 120. The user interface 130 may be a device for communicating with a user of the image processing device 100. The user interface 130 may receive a user input and provide information generated by the image processing device 100 to the user. The image processing device 100 may implement a user interface (UI) or a user experience (UX) through the user interface 130. According to an embodiment, the user interface 130 may include an input device, an output device, and a monitoring device (e.g., a viewer).

The memory 140 may be electrically connected with the processor 120. The memory 140 may store basic data for a unit, control data for operation control of the unit, and input/output data. The memory 140 may store data processed by the processor 120. The memory 140 may be configured as at least one of a ROM, a RAM, an EPROM, a flash drive, and a hard drive in terms of hardware. According to an embodiment, the memory 140 may be implemented integrally with the processor 120 or may be classified as a sub-configuration of the processor 120.

Figure 2:
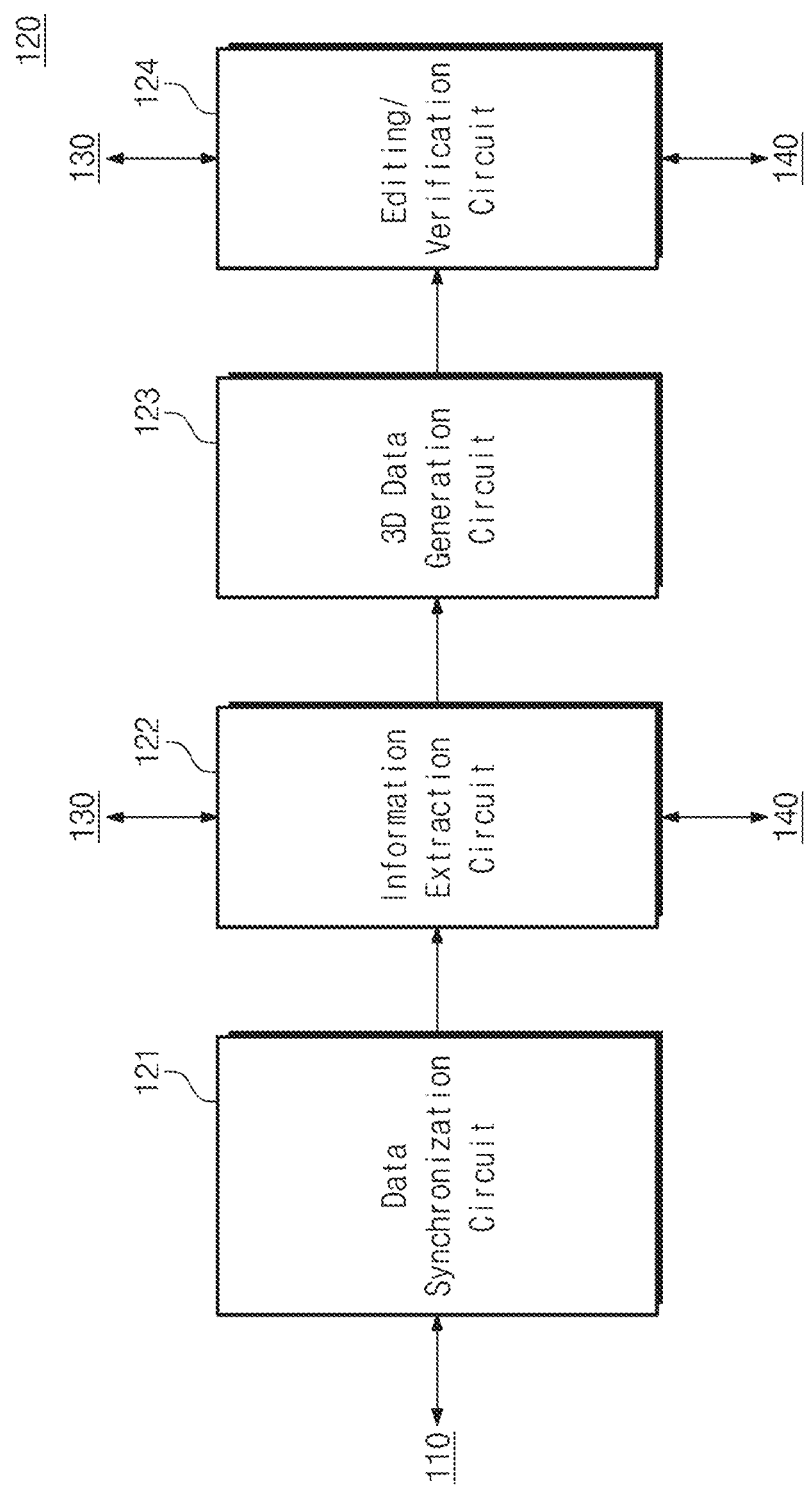
FIG. 2 is a block diagram illustrating an example of a processor of FIG. 1.

FIG. 2 is a block diagram illustrating an example of a processor of FIG. 1. Referring to FIGS. 1 and 2, the processor 120 may include a data synchronization circuit 121, an information extraction circuit 122, a 3D data generation circuit 123, and an editing/verification circuit 124.

The data synchronization circuit 121 may be configured to synchronize the sensing data of a plurality of heterogeneous sensors. For example, the data synchronization circuit 121 may control the sensor 110 to receive synchronized heterogeneous sensing data. The data synchronization circuit 121 may control and manage the first to fourth sensors 111, 112, 113, and 114 for accurate synchronization of the sensing data generated from the first to fourth sensors 111, 112, 113, and 114, respectively. A detailed description thereof will be described later with reference to FIG. 3.

The information extraction circuit 122 may receive the synchronized sensing data from the data synchronization circuit 121. The information extraction circuit 122 may extract image processing-related information from the synchronized sensing data. The image processing-related information may include position information, distance information, tracking information, metadata, camera parameter, a calibration matrix, etc. The information extraction circuit 122 may store the image processing-related information in the memory 140.

According to an embodiment, the information extraction circuit 122 may generate new information by using a part of the image processing-related information. For example, the information extraction circuit 122 may generate a point map and may generate viewpoint information from the tracking information. For example, the information extraction circuit 122 may generate multi-viewpoint image information through position information, distance information, and viewpoint information. For example, the information extraction circuit 122 may generate calibration image information through the position information, the distance information, and the calibration matrix. The information extraction circuit 122 may provide the generated information to the 3D data generation circuit 123. For example, the information extraction circuit 122 may extract a camera initial parameter according to an initial camera setting from the camera parameter.

The information extraction circuit 122 may provide some information to the user interface 130. According to an embodiment, the user interface 130 may include a data acquisition guiding viewer. The information extraction circuit 122 may provide information on the shaded area in real time through the data acquisition guiding viewer. Through this, users may acquire more accurate and precise 3D cultural asset data.

The 3D data generation circuit 123 may generate a gigapixel texture and a precise 3D mesh from the extracted and generated information. The 3D data generation circuit 123 may receive a multi-viewpoint image taken at a free viewpoint, a calibration image, and initial camera parameter, and may generate a high-resolution gigapixel texture and a 3D precise mesh through luminance restoration and geometric alignment techniques. The 3D data generation circuit 123 may generate 3D cultural asset data by matching the gigapixel texture with the 3D mesh. A detailed description thereof will be described later with reference to FIG. 5.

The editing/verification circuit 124 may receive the 3D cultural asset data from the 3D data generation circuit 123 and may verify the quality of the 3D cultural asset data. For example, the editing/verification circuit 124 may edit the 3D cultural asset data through editing techniques such as noise removal, peeling, and object separation, and may verify whether the 3D cultural asset data passes a predetermined criterion. The verified 3D cultural asset data may be stored in the memory 140 and may be provided to the user through the user interface 130.

Figure 3:
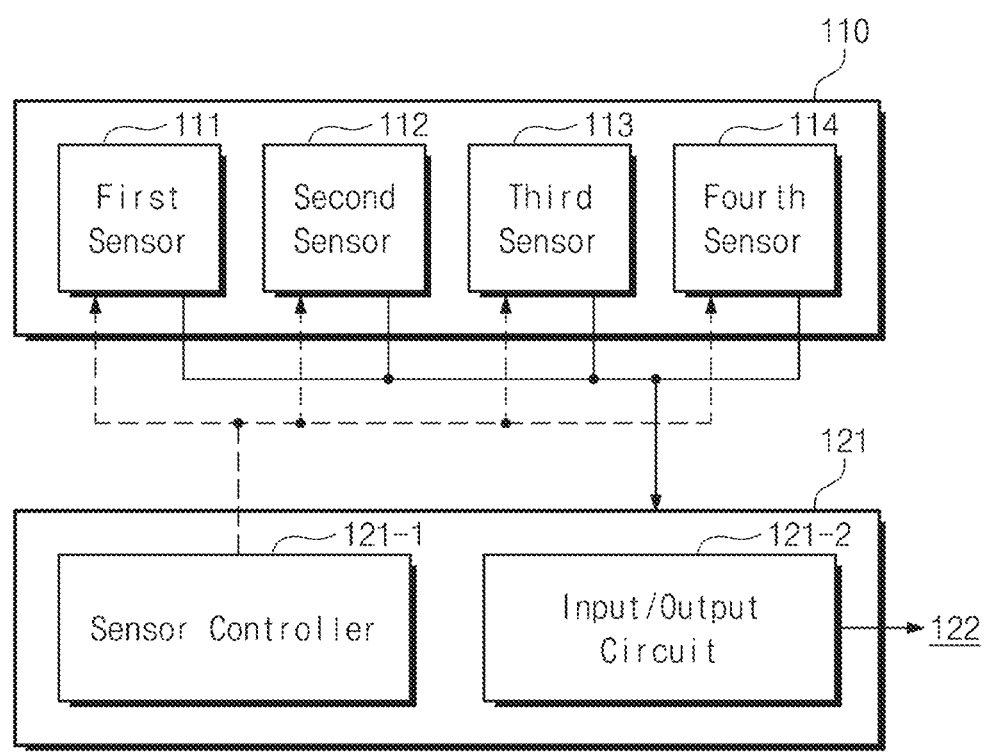
FIG. 3 is a block diagram illustrating an example of a data synchronization circuit of FIG. 2.

FIG. 3 is a block diagram illustrating an example of a data synchronization circuit of FIG. 2. Referring to FIGS. 1 to 3, the data synchronization circuit 121 may include a sensor controller 121-1 and an input/output circuit 121-2.

The sensor controller 121-1 may control an operation of the sensor 110. The sensor 110 may include the first to fourth sensors 111, 112, 113, and 114, and the sensor controller 121-1 may transmit a control signal to the first to fourth sensors 111, 112, 113, and 114 at uniform time intervals or according to user events, such that synchronized data are generated.

For example, the sensor controller 121-1 may generate a control signal for sequentially operating each of the first to fourth sensors 111, 112, 113, and 114 every a first time interval. Each of the first to fourth sensors 111, 112, 113, and 114 may provide sensing data to the input/output circuit 121-2 in response to the control signal. In this case, the sensing data may be data synchronized with the first time interval.

In the following descriptions, for convenience of description, the sensing data is described as being synchronized at uniform time intervals, but the synchronization method is not limited thereto. For example, the sensing data may be simultaneously generated. In this case, the sensor controller 121-1 may generate a control signal for simultaneously operating the first to fourth sensors 111, 112, 113, and 114.

The input/output circuit 121-2 may receive sensing data from each of the first to fourth sensors 111, 112, 113, and 114. The input/output circuit 121-2 may provide the sensing data to the information extraction circuit 122. Although not illustrated, the input/output circuit 121-2 may store the sensing data in the memory 140.

Figure 4:
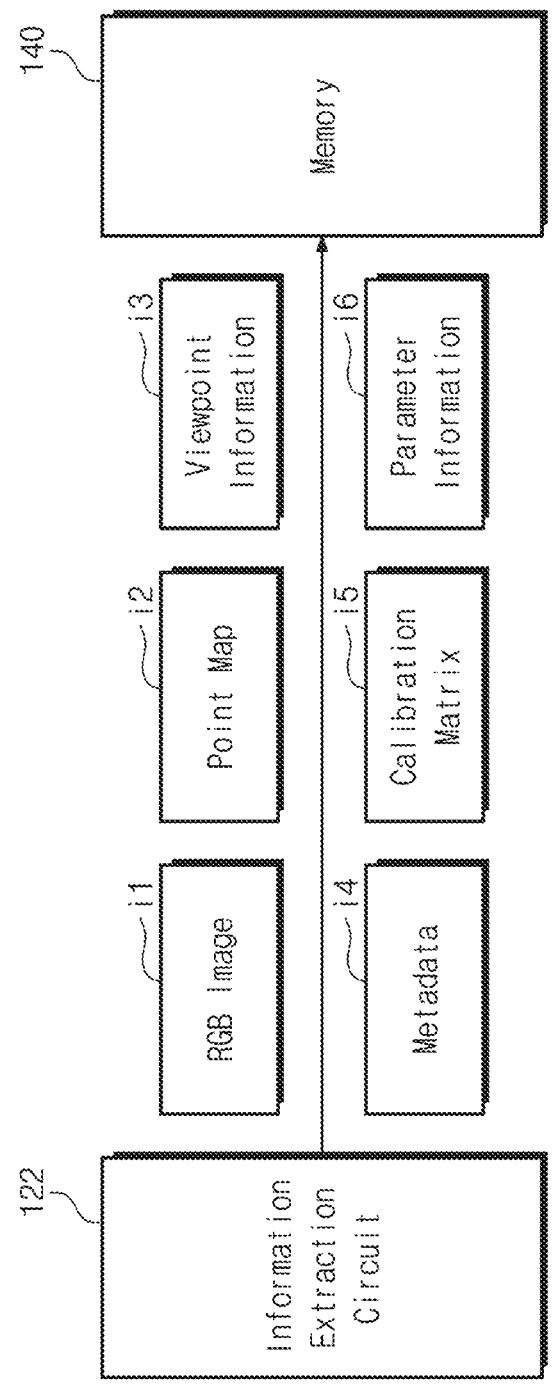
FIG. 4 is a diagram illustrating an example of information extracted and stored by an information extraction circuit of FIG. 2.

FIG. 4 is a diagram illustrating an example of information extracted and stored by an information extraction circuit of FIG. 2. Referring to FIGS. 1, 2, and 4, the information extraction circuit 122 may extract and generate image processing-related information and store it in the memory 140.

Figure 6A:
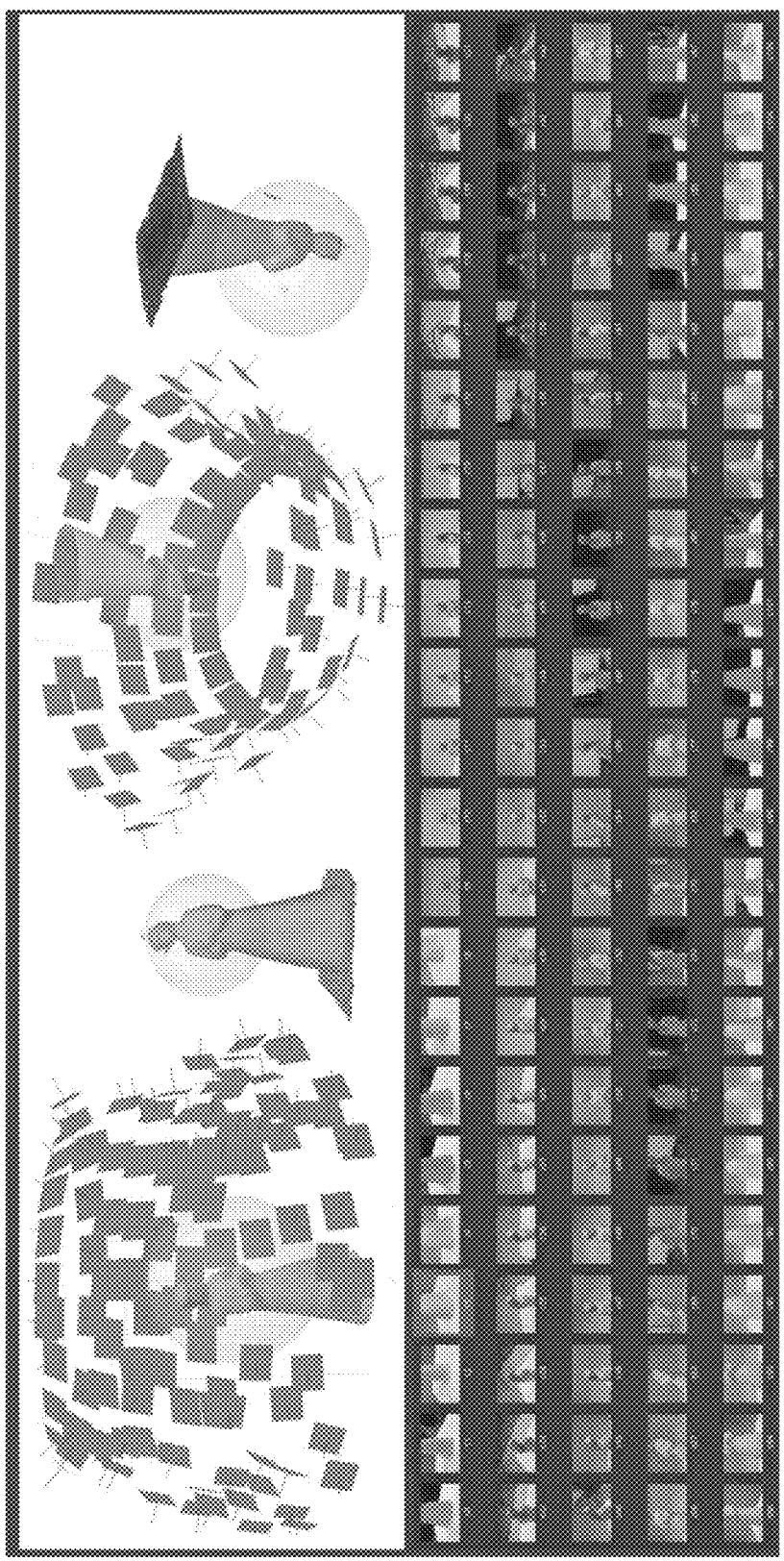
FIGS. 6A and 6B are diagrams illustrating examples of a multi-viewpoint image and a calibration image.
Figure 6B:
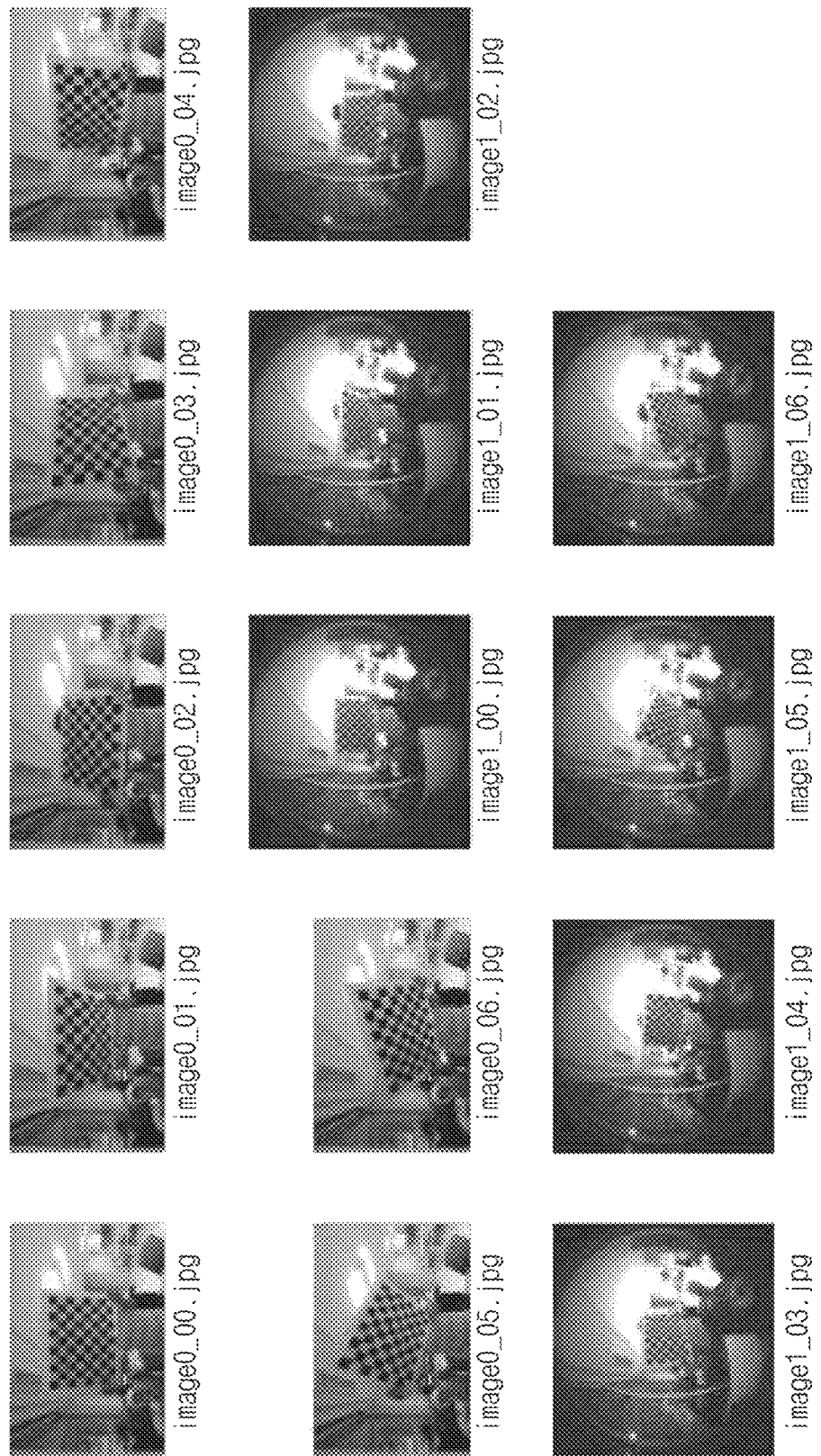

The information extraction circuit 122 may acquire an RGB image $i1$ from a high-resolution digital camera. The information extraction circuit 122 may extract tracking information associated with the target from a tracking sensor using a SLAM technology. The information extraction circuit 122 may generate a point map $i2$ based on the tracking information and may extract viewpoint information $i3$. In addition, the information extraction circuit 122 may generate a multi-viewpoint image (e.g., a multi-viewpoint image of FIG. 6A) and a calibration image (e.g., a multi-viewpoint image of FIG. 6B) based on the RGB image $i1$ and the viewpoint information $i3$.

According to an embodiment, the information extraction circuit 122 may provide the point map $i2$ and the viewpoint information $i3$ to the user interface 130 in real time. For example, the user interface 130 may include the data acquisition guiding viewer. The information extraction circuit 122 may provide information on the shadow area of the target by providing the point map $i2$ and the viewpoint information $i3$ in real time when photographing through the data acquisition guiding viewer.

According to an embodiment, the information extraction circuit 122 may extract metadata $i4$ affecting image photographing from the synchronized sensing data. For example, the metadata $i4$ may include information associated with weather, environment, lighting, time, climate, surrounding environment, light source, material, etc. The information extraction circuit 122 may extract a calibration matrix $i5$ used for data synchronization and parameter information $i6$ associated with a camera from the synchronized sensing data. The parameter information $i6$ associated with the camera may include initial camera parameter according to the initial setting of the camera.

According to an embodiment, the information extraction circuit 122 may generate the calibration matrix $i5$ based on the RGB image $i1$ and the calibration image. The information extracted and generated by the information extraction circuit 122 is not limited thereto, and may be various. The information extraction circuit 122 may provide the extracted and generated information to the 3D data generation circuit 123 or store it in the memory 140.

Figure 5:
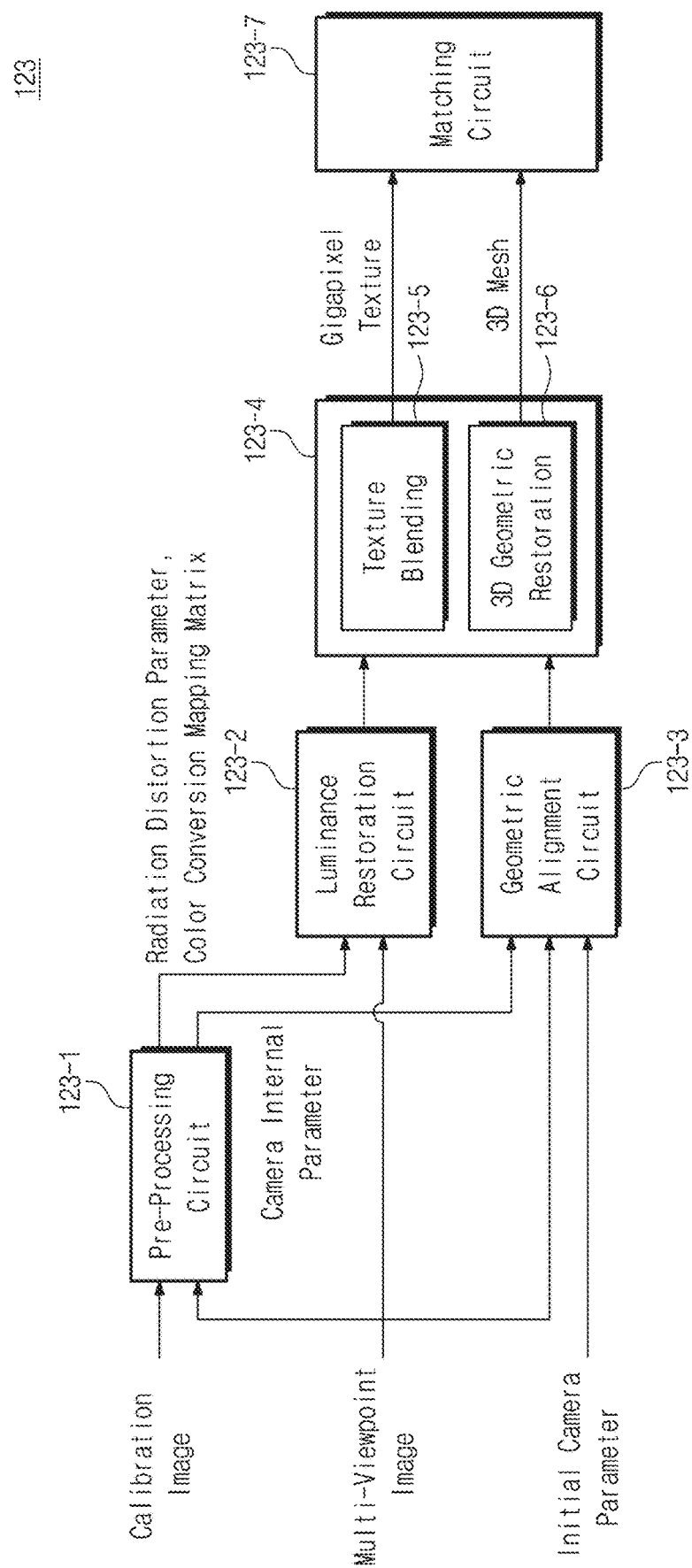
FIG. 5 is a block diagram illustrating an example of a 3D data generation circuit of FIG. 2.

FIG. 5 is a block diagram illustrating an example of a 3D data generation circuit of FIG. 2. Referring to FIGS. 1, 2, 4 and 5, the 3D data generation circuit 123 may generate the 3D cultural asset data based on the image processing-related information extracted and generated by the information extraction circuit 122. To this end, the 3D data generation circuit 123 may include a pre-processing circuit 123-1, a luminance restoration circuit 123-2, a geometric alignment circuit 123-3, a post-processing circuit 123-4, and a matching circuit 123-7.

The pre-processing circuit 123-1 may receive the calibration image and the multi-viewpoint image from the information extraction circuit 122. The pre-processing circuit 123-1 may extract a radiation distortion parameter, a color conversion mapping matrix, a camera internal parameter, etc. based on the calibration image and the multi-viewpoint image. The pre-processing circuit 123-1 may provide the radiation distortion parameter and the color conversion mapping matrix to the luminance restoration circuit 123-2. The pre-processing circuit 123-1 may provide the camera internal parameter to the geometric alignment circuit 123-3.

The luminance restoration circuit 123-2 may receive the radiation distortion parameter and the color transformation mapping matrix from the pre-processing circuit 123-1, and may receive the multi-viewpoint image from the information extraction circuit 122. The luminance restoration circuit 123-2 may generate a luminance map by restoring luminance of the multi-viewpoint image based on the color conversion mapping matrix and the radiation distortion parameter. The luminance restoration circuit 123-2 may provide the luminance map to the post-processing circuit 123-4.

The geometric alignment circuit 123-3 may receive the multi-viewpoint image and the initial camera parameter from the information extraction circuit 122, and may receive the camera internal parameter from the pre-processing circuit 123-1. The geometric alignment circuit 123-3 may obtain an optimal camera parameter by using the multi-viewpoint image, the initial camera parameter, and the camera internal parameter. For example, the optimal camera parameter may be a final camera parameter for optimal geometric alignment with respect to the multi-viewpoint image. The geometric alignment circuit 123-3 may provide the optimal camera parameter to the post-processing circuit 123-4.

The post-processing circuit 123-4 may generate the gigapixel texture and the 3D mesh using a texture blending technique 123-5 and a 3D geometric restoration technique 123-6, based on the luminance map and the optimal camera parameter. The texture blending technique 123-5 may generate the gigapixel texture through an image registration and an image stitching, and may consider a camera posture, a texture estimation accuracy, and a luminance consistency. The 3D geometric restoration technique may generate the 3D mesh using a Structure from Motion (SfM) and a Multi-view stereo (MVS). The SfM and the MVS are technologies that find 3D structure information and camera movement in a screen from images having different viewpoints.

The post-processing circuit 123-4 may provide the generated gigapixel texture and 3D mesh to the matching circuit 123-7. The matching circuit 123-7 may generate the 3D cultural asset data by matching the gigapixel texture with the 3D mesh. The matching circuit 123-7 may provide the generated 3D cultural asset data to the editing/verification circuit 124.

FIG. 7 is a flowchart illustrating an operation method of an image processing device of FIG. 1. Referring to FIGS. 1, 2, and 7, an operation method S100 of the image processing device 100 may include operations S110 to S150.

In operation S110, the image processing device 100 may synchronize the sensing data. For example, the data synchronization circuit 121 may control the sensor 110 to receive the synchronized sensing data. For example, the data synchronization circuit 121 may sequentially operate each of the first to fourth sensors 111, 112, 113, and 114 every first time interval, and may receive heterogeneous sensing data from each the first to fourth sensors 111, 112, 113, and 114.

In operation S120, the image processing device 100 may extract image processing-related information from the sensing data. For example, the information extraction circuit 122 may extract image processing-related information including position information, distance information, tracking information, metadata, camera parameter, a calibration matrix, etc. from the synchronized sensing data. According to an embodiment, the information extraction circuit 122 may generate new information such as a multi-viewpoint image, a calibration image, a calibration matrix, a point map, viewpoint information, etc. by using some of the image processing-related information. The information extraction circuit 122 may store the image processing-related information and the new information in the memory 140.

In operation S130, the image processing device 100 may generate the 3D cultural asset data based on the image processing-related information. For example, the 3D data generation circuit 123 may generate the gigapixel texture and the 3D mesh based on at least one of the information extracted and generated in operation S120. The gigapixel texture may be generated through a texture blending technique, and the texture blending technique may include image registration and image stitching. The 3D mesh may be generated through a 3D geometric reconstruction technique, and the 3D geometric reconstruction technique may include the SfM and the MVS. The 3D data generation circuit 123 may generate 3D cultural asset data by matching the gigapixel texture with the 3D mesh.

In operation S140, the image processing device 100 may edit and verify the 3D cultural asset data. For example, the editing/verification circuit 124 may edit the 3D cultural asset data through editing techniques such as noise removal, peeling, and object separation, and may verify whether the 3D cultural asset data passes a predetermined criterion. That is, the editing/verification circuit 124 may edit and verify the 3D cultural asset data generated by the 3D data generating circuit 123 to store and output the 3D cultural asset data with increased accuracy and efficiency.

In operation S150, the image processing device 100 may output the verified 3D cultural asset data. For example, the user interface 130 may include a gigapixel data viewer, and the gigapixel data viewer may visualize the 3D cultural asset data in high resolution and provide it to the user.

Figure 8:
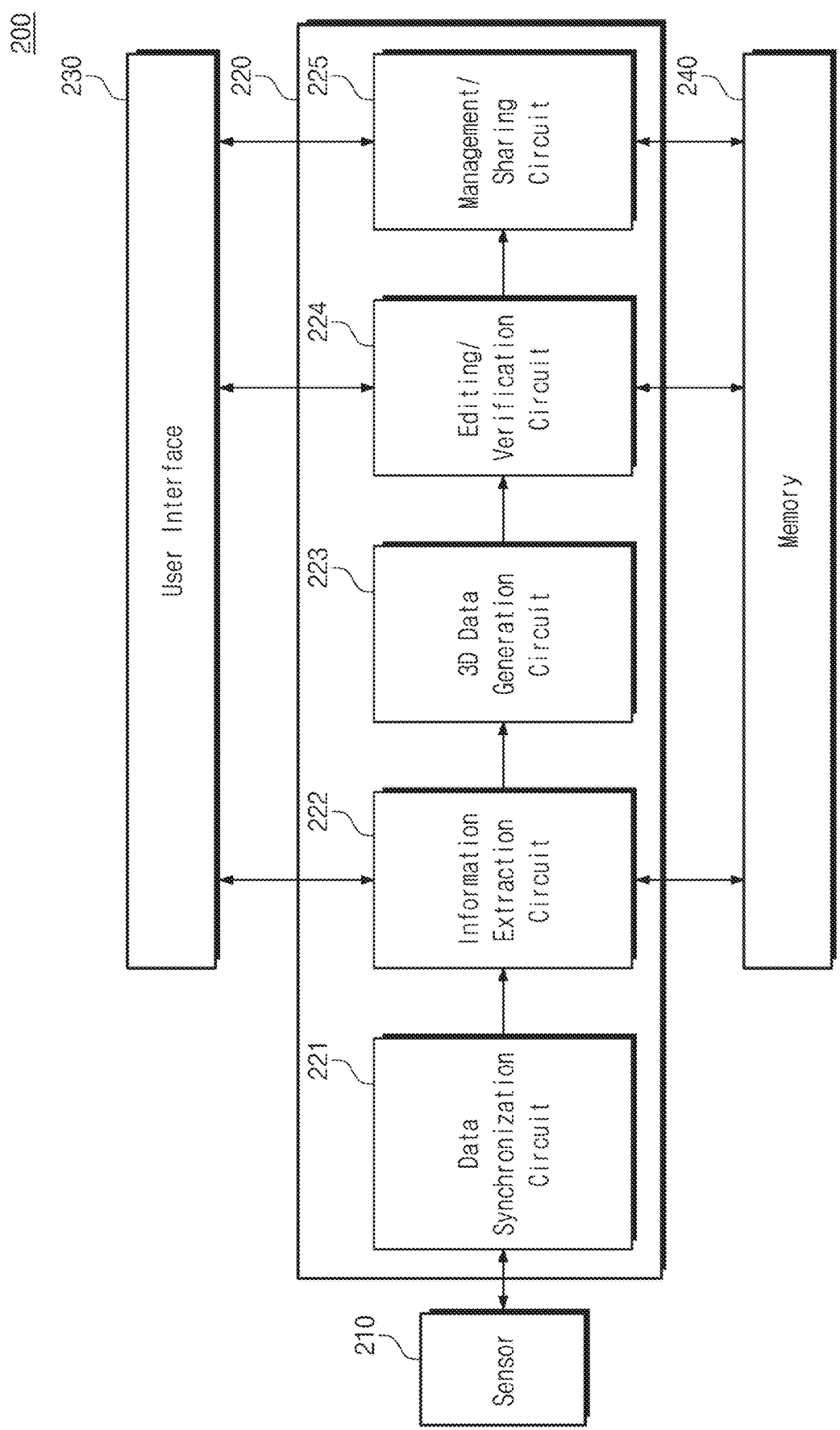
FIG. 8 is a block diagram of an image processing device according to an embodiment of the present disclosure.

FIG. 8 is a block diagram of an image processing device according to an embodiment of the present disclosure. Referring to FIGS. 1, 2, and 8, an image processing device 200 may include a sensor 210, a processor 220, a user interface 230, and a memory 240. Since the sensor 210, the user interface 230, and the memory 240 are similar to the sensor 110, the user interface 130, and the memory 140 of FIG. 1, additional descriptions thereof will be omitted to avoid redundancy.

The processor 220 may include a data synchronization circuit 221, an information extraction circuit 222, a 3D data generation circuit 223, an editing/verification circuit 224, and a management/sharing circuit 225. Since the data synchronization circuit 221, the information extraction circuit 222, the 3D data generation circuit 223, and the editing/verification circuit 224 are similar to the data synchronization circuit 121, the information extraction circuit 122, the 3D data generation circuit 123, and the editing/verification circuit 124 of FIG. 2, additional descriptions thereof will be omitted to avoid redundancy.

The data synchronization circuit 221 may control a plurality of sensors to receive synchronized heterogeneous sensing data. The information extraction circuit 222 may extract image processing-related information based on the synchronized heterogeneous sensing data. For example, the image processing-related information may include the multi-viewpoint image, the calibration image, the camera parameter, and the color conversion mapping matrix.

The 3D data generation circuit 223 may generate a luminance map and a final camera parameter by performing luminance restoration and geometric alignment based on the image processing-related information. The 3D data generation circuit 223 may generate the gigapixel texture and the 3D mesh by post-processing based on the luminance map and the final camera parameter. The 3D data generation circuit 223 may generate the 3D cultural asset data by matching the gigapixel texture with the 3D mesh.

The editing/verification circuit 224 may generate final 3D cultural asset data by performing an editing operation such as noise removal with respect to the 3D cultural asset data, and verifying whether the edited 3D cultural asset data pass a predetermined criterion. The final 3D cultural asset data may be stored in the memory 240 and may be provided to the user through the user interface 230.

The management/sharing circuit 225 may control asset management and data sharing of the 3D cultural asset data (or final 3D cultural asset data) generated by the editing/verification circuit 224. The management/sharing circuit 255 may provide a sharing platform capable of providing high-resolution data to multiple users by minimizing a load. A detailed description thereof will be described later with reference to FIG. 8.

Figure 9:
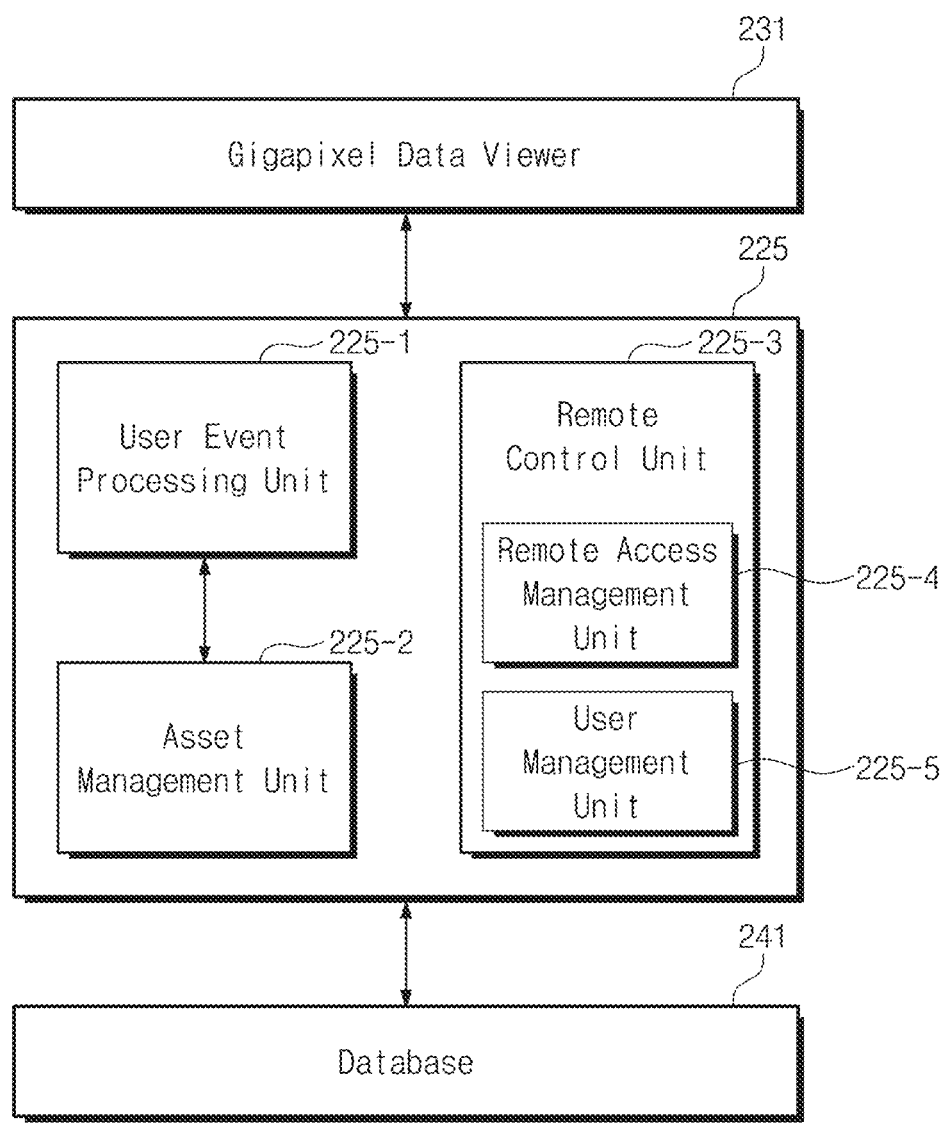
FIG. 9 is a block diagram illustrating an example of a management/sharing circuit of FIG. 8.

FIG. 9 is a block diagram illustrating an example of a management/sharing circuit of FIG. 8. Referring to FIGS. 1, 8 and 9, the management/sharing circuit 225 may include a user event processing unit 225-1, an asset management unit 225-2, and a remote control unit 225-3.

The management/sharing circuit 225 may be electrically connected to the user interface 230. For example, as an example of the user interface 230, a gigapixel data viewer 231 may visualize the 3D cultural asset data in high resolution. The management/sharing circuit 225 may receive a user event signal with respect to the 3D cultural asset data through the gigapixel data viewer 231.

The user event processing unit 225-1 may process the user event signal and may transfer a request signal with respect to the 3D cultural asset data to the asset management unit 225-2. To smoothly visualize high-resolution 3D cultural asset data, LoD (Level of Detail) technology is required, and asset linkage technology for compatibility with commercial programs is required. Accordingly, the asset management unit 225-2 may provide the 3D cultural asset data to the gigapixel data viewer 231 based on the LoD technology that renders and stores the number of polygons step by step. Also, the asset management unit 225-2 may share the 3D cultural asset data with other commercial programs based on the asset linkage technology.

The remote control unit 225-3 may support remote access of multiple users. For example, the remote control unit 225-3 may include a remote access management unit 225-4 and a user management unit 225-5. The remote access management unit 225-4 may process and manage remote access of multiple users. For example, the remote access management unit 225-4 may manage remote access of multiple users through channel management. The user management unit 225-5 may manage multiple users using remote access. For example, the user management unit 225-5 may store information of multiple users in a database 241. The database 241 may be included in the memory 240.

Figure 10:
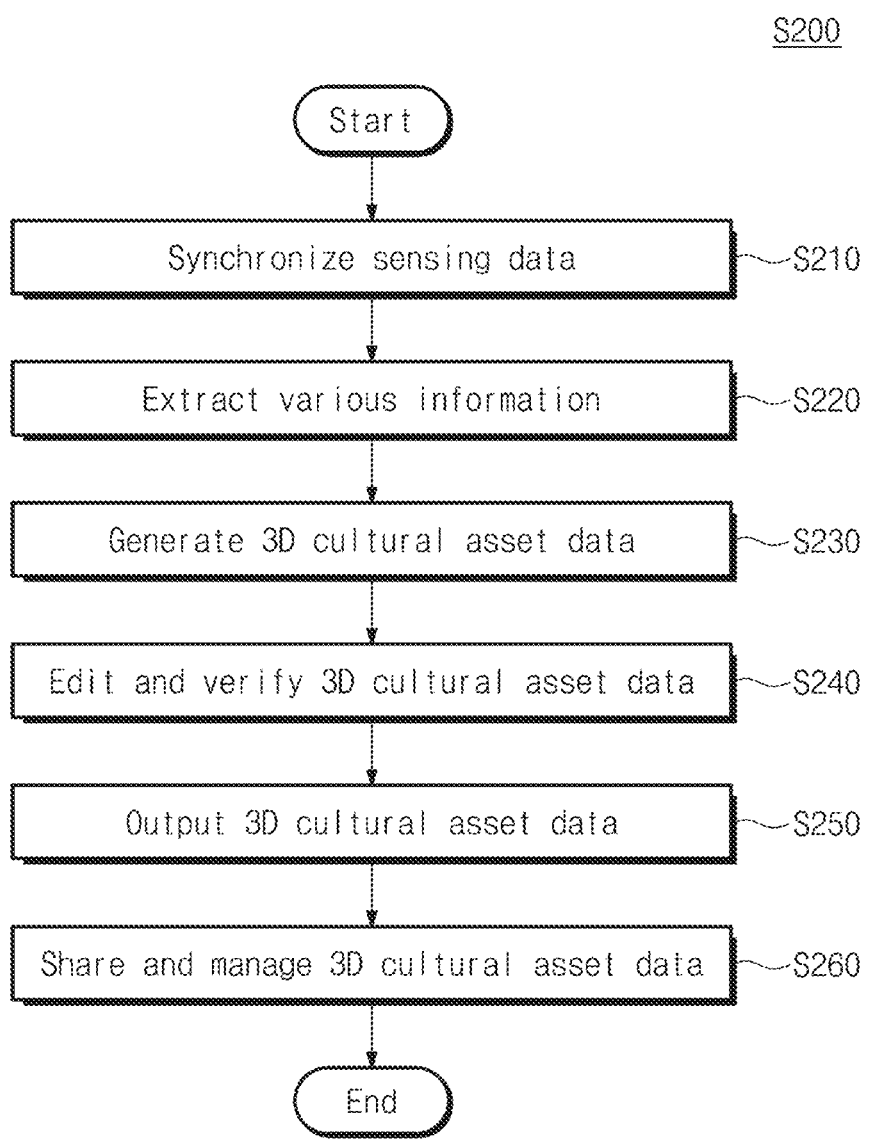
FIG. 10 is a flowchart illustrating an operation method of an image processing device of FIG. 8.

FIG. 10 is a flowchart illustrating an operation method of an image processing device of FIG. 8. Referring to FIGS. 7, 8, and 10, an operation method S200 of the image processing device 200 may include operations S210 to S260. Since operations S210 to S250 are similar to operations S110 to S150 of FIG. 7, additional descriptions thereof will be omitted to avoid redundancy.

In operation S210, the image processing device 200 may synchronize the sensing data. In operation S220, the image processing device 200 may extract image processing-related information from the sensing data. For example, the image processing-related information may include the multi-viewpoint image, the calibration image, the camera parameter, and the color conversion mapping matrix. In operation S230, the image processing device 200 may generate the gigapixel texture and the 3D mesh based on the image processing-related information, and may generate the 3D cultural asset data.

In operation S240, the image processing device 200 may edit and verify the 3D cultural asset data. In operation S250, the image processing device 200 may output the final 3D cultural asset data that are passed in the verifying.

In operation S260, the image processing device 200 may share the 3D cultural asset data with other users. For example, the management/sharing circuit 225 may provide the 3D cultural asset data to a plurality of users visually through LoD technology, and may provide compatibility with other 3D commercial programs through asset linkage technology. In addition, the management/sharing circuit 225 may extract information about the shared user and channel and store it in the memory 240.

According to an embodiment of the present disclosure, an image processing device may generate more accurate and high-resolution 3D cultural asset data by utilizing various information such as metadata, camera parameter, and a calibration matrix along with information from heterogeneous sensors. In addition, a shaded area may be identified in real time through the viewer, and it is easy to use.

Meanwhile, the LoD (Level of Detail)-based 3D cultural asset data sharing function allows high-resolution data to be provided to multiple users without a load on the system, and the asset link function may improve the management and utilization of cultural asset data through compatibility with 3D commercial products.

The above description refers to embodiments for implementing the present disclosure. Embodiments in which a design is changed simply or which are easily changed may be included in the present disclosure as well as an embodiment described above. In addition, technologies that are easily changed and implemented by using the above embodiments may be included in the present disclosure. While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An image processing device comprising:
   a plurality of sensors configured to output two or more different types of sensing data;
   a processor configured to:
      synchronize the sensing data output by the plurality of sensors;
      extract image processing-related information from the synchronized sensing data; and
      generate a gigapixel texture and a three-dimensional (3D) mesh based on the image processing-related information;
   a user interface configured to visualize and output 3D cultural asset data that is generated based on the gigapixel texture and the 3D mesh; and
   a memory configured to store the image processing-related information and the 3D cultural asset data,
   wherein the image processing-related information includes a multi-viewpoint image, a calibration image, and a camera parameter.

2. The image processing device of claim 1, wherein the plurality of sensors includes:
   a first sensor including a digital camera;
   a second sensor including a tracking sensor; and
   a third sensor including at least one of a depth sensor and a lidar.

3. The image processing device of claim 1, wherein the processor includes:
   a data synchronization circuit configured to control the plurality of sensors to receive the synchronized sensing data;
   an information extraction circuit configured to extract the image processing-related information based on the sensing data;

a 3D data generation circuit configured to:
generate the gigapixel texture and the 3D mesh through luminance restoration and geometric alignment based on the image processing-related information; and
generate the 3D cultural asset data by matching the gigapixel texture to the 3D mesh; and
an editing/verification circuit configured to:
generate final 3D cultural asset data by removing noise from the 3D cultural asset data; and
verify whether the noise-removed 3D cultural asset data passes a predetermined criterion.

4. The image processing device of claim 3, wherein the data synchronization circuit includes:
a sensor controller configured to generate a control signal that sequentially operates the plurality of sensors at specific time intervals; and
an input/output circuit configured to:
receive the synchronized sensing data from each of the plurality of sensors; and
provide the received sensing data to the information extraction circuit.

5. The image processing device of claim 3, wherein the information extraction circuit is further configured to:
extract distance information and viewpoint information from the sensing data, and generate the multi-viewpoint image and the calibration image based on the distance information and the viewpoint information; and
extract the camera parameter including an initial camera parameter from the sensing data.

6. The image processing device of claim 5, wherein the information extraction circuit is further configured to:
extract tracking information from the sensing data;
generate a point map based on the tracking information; and
provide the point map and the viewpoint information to the user interface in real time.

7. The image processing device of claim 5, wherein the 3D data generation circuit includes:
a pre-processing circuit configured to extract a radial distortion parameter, a color conversion mapping matrix, and a camera internal parameter based on the multi-viewpoint image and the calibration image;
a luminance restoration circuit configured to generate a luminance map by performing the luminance restoration on the multi-viewpoint image based on the multi-viewpoint image, the radial distortion parameter, and the color conversion mapping matrix;
a geometric alignment circuit configured to perform a geometric alignment on the multi-viewpoint image based on the multi-viewpoint image, the initial camera parameter, and the camera internal parameter to generate a final camera parameter; and
a post-processing circuit configured to generate the gigapixel texture and the 3D mesh based on the luminance map and the final camera parameter.

8. The image processing device of claim 7, wherein the post-processing circuit is further configured to:
generate the gigapixel texture using a texture blending technique based on the luminance map and the final camera parameter; and
generate the 3D mesh using a 3D geometric restoration technique.

9. The image processing device of claim 7, wherein the 3D data generation circuit further includes a matching circuit configured to generate the 3D cultural asset data by matching the gigapixel texture to the 3D mesh.

10. The image processing device of claim 3, wherein the user interface is configured to:
receive the final 3D cultural asset data from the editing/verification circuit; and
output the final 3D cultural asset data to a user through a gigapixel data viewer.

11. The image processing device of claim 3, wherein the processor further includes a management/sharing circuit configured to share the 3D cultural asset data with a plurality of users.

12. The image processing device of claim 11, wherein the management/sharing circuit is configured to:
visualize the 3D cultural asset data based on an LoD (Level of Detail) technology to be shared with the plurality of users; and
share the 3D cultural asset data with other commercial programs based on an asset linkage technology.

13. A method of operating an image processing device, the method comprising:
controlling a plurality of heterogeneous sensors to receive synchronized sensing data;
extracting image processing-related information from the synchronized sensing data;
generating 3D data including a gigapixel texture and a three-dimensional (3D) mesh based on the image processing-related information;
generating 3D cultural asset data by matching the gigapixel texture to the 3D mesh; and
visualizing the 3D cultural asset data and outputting the visualized 3D cultural asset data through a user interface,
wherein the image processing-related information includes a multi-viewpoint image, a calibration image, and a camera parameter.

14. The method of claim 13, wherein the extracting of the image processing-related information includes:
extracting distance information and viewpoint information from the sensing data, and generating the multi-viewpoint image and the calibration image based on the distance information and the viewpoint information; and
extracting the camera parameter including an initial camera parameter from the sensing data.

15. The method of claim 14, wherein the extracting of the image processing-related information further includes:
extracting tracking information from the sensing data;
generating a point map based on the tracking information; and
providing the point map and the viewpoint information to the user interface in real time.

16. The method of claim 14, wherein the generating of the 3D data includes:
extracting a radial distortion parameter, a color conversion mapping matrix, and a camera internal parameter based on the multi-viewpoint image and the calibration image;
generating a luminance map by performing the luminance restoration on the multi-viewpoint image based on the multi-viewpoint image, the radial distortion parameter, and the color conversion mapping matrix;
performing a geometric alignment on the multi-viewpoint image based on the multi-viewpoint image, the initial camera parameter, and the camera internal parameter to generate a final camera parameter; and
generating the gigapixel texture and the 3D mesh based on the luminance map and the final camera parameter.

17. The method of claim 16,
wherein the gigapixel texture is generated by using a texture blending technique based on the luminance map and the final camera parameter, and
wherein the 3D mesh is generated by using a 3D geometric restoration technique based on the luminance map and the final camera parameter.

18. The method of claim 13, further comprising:
editing/verifying the 3D cultural asset data, and
wherein the editing/verifying of the 3D cultural asset data includes:
  removing noise with respect to the 3D cultural asset data;
  verifying whether the noise-removed 3D cultural asset data passes a predetermined criterion; and
  generating final 3D cultural asset data that are passed in the verifying and storing the final 3D cultural asset data.

19. The method of claim 18, wherein the outputting of the visualized 3D cultural asset data through the user interface includes outputting the final 3D cultural asset data to a user through a gigapixel data viewer.

20. The method of claim 13, further comprising:
visualizing the 3D cultural asset data based on technology to be shared with the plurality of users; and
sharing the 3D cultural asset data with other commercial programs based on an asset linkage technology.

* * * * *